(No Model.)
H. FOX.
APPARATUS FOR PREPARING GRAIN FOR MASHING.
No. 341,801. Patented May 11, 1886.
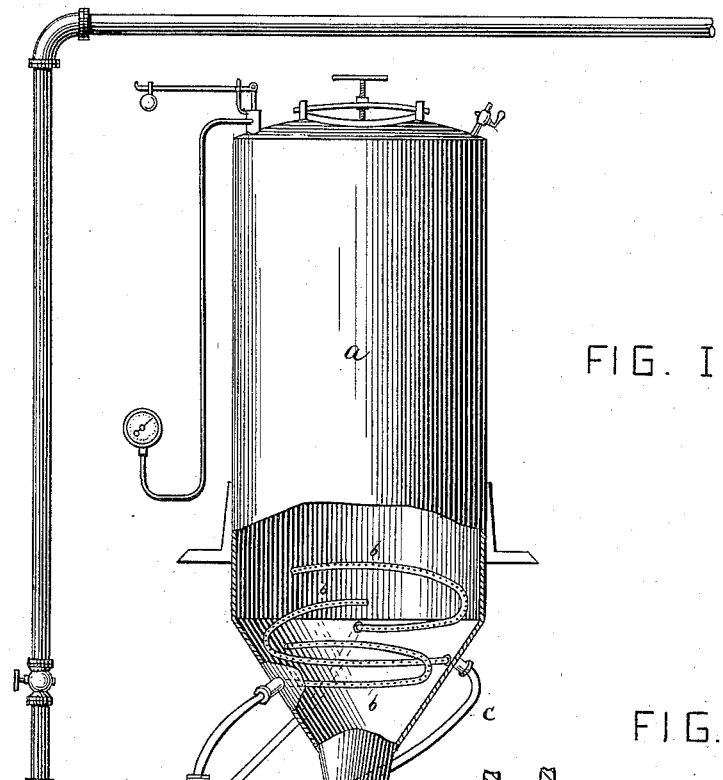
FIG. I.
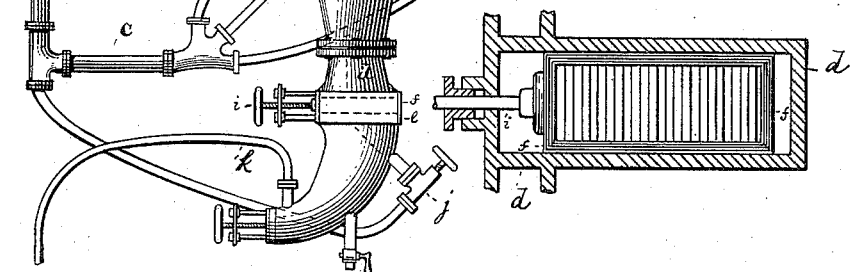
FIG. III.
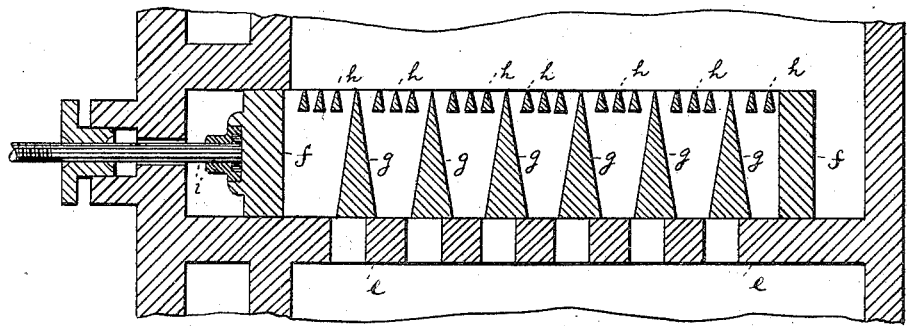
FIG. II.
Witnesses
Wm A. Lowe
Robt H. Roy
Inventor
Hermann Fox
By his Attorneys Roeder & Briesen

UNITED STATES PATENT OFFICE.

HERMANN FOX, OF NEW YORK, N. Y.

APPARATUS FOR PREPARING GRAIN FOR MASHING.

SPECIFICATION forming part of Letters Patent No. 341,801, dated May 11, 1886.

Application filed January 20, 1886. Serial No. 189,164. (No model.)

*To all whom it may concern:*

Be it known that I, HERMANN FOX, of the city of New York, county and State of New York, have invented a new and Improved Apparatus for Preparing Grain for Mashing, of which the following specification is a full, clear, and exact description.

This invention relates to an apparatus for preparing grain for mashing.

My apparatus is constructed to receive the malt from the kiln, and to force it, by steam-pressure, through a screen of peculiar construction, by which it is properly broken up.

The invention consists in the elements of construction hereinafter more fully pointed out.

In the accompanying drawings, Figure I is a sectional side view of my improved apparatus. Fig. II is a longitudinal section of the screen on an enlarged scale, and Fig. III is a top view of the same.

The letter $a$ represents a boiler adapted to receive the malt, and containing a number of perforated worms, $b$, connected to steam-pipes $c$. The boiler $a$ terminates in a contracted neck, $d$, within which the screen is situated. This screen consists of a lower perforated or slotted plate, $e$, and of an upper plate, $f$, provided with a number of parallel tapering bars, $g$, of a height to rest upon plate $e$. Between the bars $g$ there are a number of knives, $h$, which are flush at their upper edges with the bars $g$. The frame $f$, with its bars $g$ and knives $h$, may be moved backward and forward by means of a screw, $i$, Fig. 1. When in one position, the bases of bars $g$ close openings of plate $e$, while in the other position such openings are left unobstructed.

$j$ is a steam-pipe projecting against the lower face of plate $e$, and adapted to throw a jet of steam against such plate in case it should become clogged.

The operation of the parts is as follows: The malt being thrown into the boiler, the screen is closed, and steam and water are admitted into the worms to operate upon the malt. When this operation has been completed, the screen is opened, and the malt is, by the action of the steam, forced between the bars $g$ and knives $h$, where it is properly crushed. Thence the malt is forced between the base-sections of bars $g$, where it receives a secondary crushing, and out of plate $e$ into a discharge-pipe, $k$.

I claim as my invention—

1. The combination of boiler $a$, having worms $b$, with plate $e$ and adjustable plate $f$, provided with tapering bars $g$ and intermediate knives, $h$, substantially as specified.

2. The combination of boiler $a$, having worms $b$, with plates $e$ $f$, the plate $f$ having bars $g$ and knives $h$, and with screw $i$ and steam-pipe $j$, substantially as specified.

HERMANN FOX.

Witnesses:
F. V. BRIESEN,
ROBT. H. ROY.